(12) United States Patent
Garland et al.

(10) Patent No.: US 8,773,422 B1
(45) Date of Patent: Jul. 8, 2014

(54) SYSTEM, METHOD, AND COMPUTER PROGRAM PRODUCT FOR GROUPING LINEARLY ORDERED PRIMITIVES

(75) Inventors: Michael J. Garland, Lake Elmo, MN (US); Timo O. Aila, Tuusula (FI); Shubhabrata Sengupta, Davis, CA (US)

(73) Assignee: NVIDIA Corporation, Santa Clara, CA (US)

( * ) Notice: Subject to any disclaimer, the term of this patent is extended or adjusted under 35 U.S.C. 154(b) by 707 days.

(21) Appl. No.: 11/950,193

(22) Filed: Dec. 4, 2007

(51) Int. Cl.
*G06T 15/00* (2011.01)

(52) U.S. Cl.
USPC ............ 345/418; 345/419; 345/629; 345/441; 382/103; 382/107; 707/765

(58) Field of Classification Search
USPC .......... 345/418, 419, 629, 441; 382/107, 103; 707/765
See application file for complete search history.

(56) References Cited

U.S. PATENT DOCUMENTS

| | | | |
|---|---|---|---|
| 4,628,483 A | 12/1986 | Nelson | |
| 4,855,937 A | 8/1989 | Heartz | |
| 5,193,207 A | 3/1993 | Vander Vegt et al. | |
| 5,274,718 A | 12/1993 | Leonardi et al. | |
| 5,594,844 A | 1/1997 | Sakai et al. | |
| 5,621,908 A | 4/1997 | Akaboshi et al. | |
| 5,650,862 A | 7/1997 | Shimizu et al. | |
| 5,963,212 A | 10/1999 | Bakalash | |
| 6,065,005 A | 5/2000 | Gal et al. | |
| 6,489,955 B1 | 12/2002 | Newhall, Jr. | |
| 6,518,971 B1 | 2/2003 | Pesto, Jr. et al. | |
| 6,549,907 B1 | 4/2003 | Fayyad et al. | |
| 6,556,200 B1 * | 4/2003 | Pfister et al. | 345/426 |
| 6,633,882 B1 | 10/2003 | Fayyad et al. | |
| 6,738,518 B1 | 5/2004 | Minka et al. | |
| 6,825,839 B2 * | 11/2004 | Huang et al. | 345/423 |
| 6,879,980 B1 * | 4/2005 | Kothuri et al. | 707/765 |
| 7,146,486 B1 | 12/2006 | Prokopenko et al. | |
| 7,194,125 B2 | 3/2007 | Vlasic et al. | |
| 7,348,975 B2 | 3/2008 | Reshetov et al. | |
| 7,580,927 B1 * | 8/2009 | Abugov et al. | 1/1 |
| 7,616,782 B2 * | 11/2009 | Badawy | 382/107 |
| 7,903,125 B1 * | 3/2011 | Ayers et al. | 345/629 |
| 7,986,810 B2 * | 7/2011 | Badawy | 382/103 |
| 8,065,288 B1 | 11/2011 | Garland et al. | |
| 8,081,198 B1 * | 12/2011 | Ayers et al. | 345/629 |
| 8,243,083 B1 | 8/2012 | Garland et al. | |

(Continued)

FOREIGN PATENT DOCUMENTS

| | | |
|---|---|---|
| WO | 2007082042 A2 | 7/2007 |
| WO | 2008127610 A2 | 10/2008 |
| WO | 2008127622 A2 | 10/2008 |
| WO | 2008127623 A2 | 10/2008 |

OTHER PUBLICATIONS

V. Havran. *"Heuristic Ray Shooting Algorithms."* Ph.D. thesis, Czech Technical University, Nov. 2000.

(Continued)

*Primary Examiner* — Phu K Nguyen
(74) *Attorney, Agent, or Firm* — Zilka-Kotab, PC

(57) ABSTRACT

A system, method, and computer program product are provided for grouping linearly ordered primitives. In operation, a plurality of primitives are linearly ordered. Additionally, the primitives are grouped. Furthermore, at least one intersection query is performed, utilizing the grouping.

24 Claims, 9 Drawing Sheets

(56) References Cited

U.S. PATENT DOCUMENTS

| | | | |
|---|---|---|---|
| 8,264,484 | B1 | 9/2012 | Lauterbach et al. |
| 8,284,188 | B1 | 10/2012 | Lauterbach et al. |
| 8,321,492 | B1 | 11/2012 | Sengupta et al. |
| 8,661,226 | B2 | 2/2014 | Garland et al. |
| 2003/0028509 | A1 | 2/2003 | Sah et al. |
| 2004/0210596 | A1 | 10/2004 | Budd et al. |
| 2005/0001844 | A1 | 1/2005 | Naegle |
| 2005/0177564 | A1 | 8/2005 | Kobayashi et al. |
| 2007/0106989 | A1 | 5/2007 | Kissell |
| 2007/0159488 | A1 | 7/2007 | Danskin et al. |
| 2007/0165035 | A1 | 7/2007 | Duluk, Jr. et al. |
| 2007/0169042 | A1 | 7/2007 | Janczewski |
| 2007/0182732 | A1 | 8/2007 | Woop et al. |
| 2007/0260663 | A1 | 11/2007 | Frigo et al. |
| 2007/0264023 | A1 | 11/2007 | Gorrell et al. |
| 2008/0005547 | A1 | 1/2008 | Papakipos et al. |
| 2008/0043018 | A1 | 2/2008 | Keller et al. |
| 2008/0316214 | A1 | 12/2008 | Peeper |
| 2009/0089542 | A1 | 4/2009 | Laine et al. |
| 2009/0106530 | A1 | 4/2009 | Lauterbach et al. |
| 2009/0132878 | A1 | 5/2009 | Garland et al. |
| 2010/0076941 | A1 | 3/2010 | Dotsenko et al. |

OTHER PUBLICATIONS

V. Havran and J. Bittner. "Efficient sorting and searching in rendering algorithms." *Eurographics 2006 Tutorials*, Tutorial T4, Aug. 2006. http://moon.felk.evut.ez/~havran/eg2006tut/tut4eg06.pdf.

I. Kamel and C. Faloutsos. "On Packing R-trees." In *Proc. 2nd Int'l Conf. on Information & Knowledge Management*, Nov. 1993.

V. Pascucci and R. Frank. "Global Static Indexing for Real-time Exploration of Very Large Regular Grids." In *Proc. Supercomputing 2001*, Nov. 2001.

C. Wächter and A. Keller. "Instant Ray Tracing: The Bounding Interval Hierarchy." In *Proc. Eurographics Symposium on Rendering Techniques*, Apr. 2006.

S.-E. Yoon, P. Lindstrom, V. Pascucci, and D. Manocha. "Cache-oblivious mesh layouts." *ACM Transactions on Graphics*, Proc. SIGGRAPH 2005, 24(3), Jul. 2005.

Popov et al., "Stackless KD-Tree Traversal for High Performance GPU Ray Tracing," Eurographics 2007, vol. 26 (2007), No. 3.

Sengupta et al., "Scan Primitives for GPU Computing," Proceedings of Graphics Hardware 2007, San Diego, CA, Aug. 4-5, 2007.

Harris et al., "Parallel Prefix Sum Scan with CUDA,"to appear in *GPU Gems 3*, Hubert Nguyen, ed., Addison-Wesley, 2007.

Blelloch "Prefix Sums and Their Applications,"Carnegie Mellon University School of Computer Science, Technical Report CMU-CS-90-190, Nov. 1990.

D. Naishlos, J. Nuzman, C-W. Tseng, and U. Vishkin, 2001. Towards a first vertical prototyping of an extremely fine-grained parallel programming approach. In *Proc. 13th ACM Symposium on Parallel Algorithms and Architecture (SPAA 01)*, Jul. 2001.

Johannes Günther, Stefan Popov, Hans-Peter Seidel, and Philipp Slusallek. "Realtime Ray Tracing on GPU with BVH-based Packet Traversal." Proceedings of the IEEE/Eurographics Symposium on Interactive Ray Tracing 2007, pp. 113-118. http://www.mpi-inf.mpg.de/~guenther/BVHonGPU/BVHonGPU.pdf.

Daniel Horn, Jeremy Sugerman, Mike Houston, Pat Hanrahan. "Interactive k-D Tree GPU Raytracing." Symposium on Interactive 3D Graphics and Games, 2007. http://graphics.stanford.edu/papers/i3dkdtree.

Ingo Wald. *Realtime Ray Tracing and Interactive Global Illumination*. Ph.D. dissertation, Universität des Saarlandes, 2004. http://www.sci.utah.edu/~wald/Publications/2004/WaldPhD/download/phd.pdf.

G. Blelloch, 1990. *Vector Models for Data-Parallel Computing*. MIT Press, ISBN 0-262-02313-X, 1990. http://www.cs.cmu.edu/~guyb/papers/Ble90.pdf.

Thinking Machines Corp., 1990. *Connection Machine Model CM-2 Technical Summary*. Version 6.0, Nov. 1990.

Gottschalk et al., "OBBTree: A Hierarchical Structure for Rapid Interference Detection," Proceedings of the 23rd Annual Conference on Computer Graphics and Interactive Techniques, 1996, pp. 171-180, vol. 30, ACM, New York, NY.

Arvo et al., "Fast Ray Tracing by Ray Classification," Proceedings of the 14th Annual Conference on Computer Graphics and Interactive Techniques, SIGGRAPHS, Jul. 1987, pp. 55-64, vol. 21, No. 4, ACM, New York, NY.

Hillis et al., "Data Parallel Algorithms," Communications of the ACM, Dec. 1986, pp. 1170-1183, vol. 29, No. 12, ACM, New York, NY.

Miyashita et al., "An Algorithm for Computing Prefix Sum on a Reconfigurable Array," Academic Journal, Transactions of the Iinstitute of Electronics, Information and Communication Engineers (IEICE) D-I, Oct. 25, 1994, pp. 703-711, vol. J77-D-I, No. 10, Japan.

Roger et al. "Whitted Ray-Tracing for Dynamic Scenes using a Ray-Space Hierarchy on the GPU," Eurographics Symposium on Rendering, Jun. 2007, pp. 99-110.

Sato et al., "Implementing the PRAM Algorithms in the Multithread Architecture and Evaluating the Performance," Information Processing Society of Japan (IPSJ), SIG Notes '98 (28), Mar. 20, 1998, pp. 39-46, Japan.

Wald et al., "Interactive Rendering with Coherent Ray Tracing," Computer Graphics Forum, Jul. 25, 2002, pp. 153-164, vol. 20 (2001), No. 3, Eurographics 2001.

Wald, Ingo , "On Fast Construction of SAH-based Bounding Volume Hierarchies," IEEE Symposium on Interactive Ray Tracing, 2007., pp. 33-40, RT 200, IEEE Computer Society, Washington DC.

Wald et al., "SIMD Ray Stream Tracing—SIMD Ray Traversal with Generalized Ray Packets and On-the-fly Re-Ordering," SCI Institute Technical Report, UUSCI-2007-012, Aug. 2, 2007, pp. 1-9, Salt Lake City, Utah.

Zagha et al., "Radix Sort for Vector Multiprocessors," Proceedings of the 1991 ACM/IEEE Conference on Supercomputing, 1991, pp. 712-721, ACM, New York, NY.

Non-Final Office Action from U.S. Appl. No. 11/950,245, dated Oct. 9, 2012.

Chinese Office Action from Application No. 200810172720.0, dated Apr. 8, 2011.

Advisory Action from U.S. Appl. No. 11/942,608, dated Jul. 18, 2011.

Final Office Action from U.S. Appl. No. 11/950,245, dated May 25, 2011.

Non-Final Office Action from U.S. Appl. No. 11/950,245, dated Oct. 5, 2010.

Non-Final Office Action from U.S. Appl. No. 12/333,255, dated Oct. 11, 2011.

Sengupta, S. et al., U.S. Appl. No. 11/950,245, filed Dec. 4, 2007.

Sengupta, S. et al., U.S. Appl. No. 12/333,244, filed Dec. 11, 2008.

Garland, M. et al., U.S. Appl. No. 12/333,255, filed Dec. 11, 2008.

Stratton, J. A. et al., "MCUDA: An Efficient Implementation of CUDA Kernels on Multi-Cores," IMPACT Technical Report, IMPACT-08-01, Mar. 12, 2008, pp. 1-18.

Blelloch , G. E., "Programming Parallel Algorithms," Communications of the ACM, Mar. 1996, vol. 39, No. 3, pp. 85-97.

Blelloch, G. E. et al., "Implementation of a Portable Nested Data-Parallel Language," Journal of Parallel and Distributed Computing, Apr. 1994, 21(1), pp. 4-14.

Chatterjee, S. et al., "Scan Primitives for Vector Computers," Proceedings of Supercomputing '90, Nov. 12-16, 1990, pp. 666-675.

Dotsenko, Y. et al., "Fast Scan Algorithms on Graphics Processors," International Conference on Supercomputing, Jun. 7-12, 2008, pp. 205-213.

Gibbons, P. B., "A More Practical PRAM Model," ACM Symposium on Parallel Algorithms and Architectures—SPAA, 1989, pp. 158-168.

Hensley, J. et al., "Fast Summed-Area Table Generation and its Applications," EUROGRAPHICS 2005, 2005, vol. 24, No. 3, pp. 1-9.

Horn, D., "Stream Reduction Operations for GPGPU Applications," GPU Gems 2: Programming Techniques for High-Performance Graphics and General-Purpose Computation, Chapter 36, Second

(56) References Cited

OTHER PUBLICATIONS

Printing, Apr. 2005, retrieved from http://http.developer.nvidia.com/GPUGems2/gpugems2_chapter36.html on Jul. 12, 2011, pp. 1-11.
Iverson, K. E., "A Programming Language," John Wiley & Sons, Fourth Printing, May 1967, pp. vii-xxi and 1-286.
Lindholm, E. et al., "NVIDIA Tesla: A Unified Graphics and Computing Architecture," IEEE Micro, Mar.-Apr. 2008, pp. 39-55.
Nickolls, J. et al., "Scalable Parallel Programming with CUDA," ACM Queue, Mar.-Apr. 2008, pp. 42-53.
NVIDIA Corporation, "NVIDIA CUDA Programming Guide," Nov. 29, 2007, Version 1.1, pp. ii-xiii and 1-128.
Reshetov, A. et al., "Multi-Level Ray Tracing Algorithm," ACM Transactions on Graphics (TOG), Proceedings of ACM SIGGRAPH 2005, Jul. 2005, vol. 24, Issue 3, pp. 1176-1185.
Schwartz, J. T., "Ultracomputers," ACM Transactions on Programming Languages and Systems, Oct. 1980, vol. 2, No. 4, pp. 484-521.
Sengupta, S. et al., "A Work-Efficient Step Efficient Prefix-Sum Algorithm," Proceedings of the Workshop on Edge Computing Using New Commodity Architectures, 2006, pp. 1-2.
Sengupta, S. et al., "Data-Parallel GPU Computing," May 31, 2008, pp. 1-28.
Advisory Action from U.S. Appl. No. 11/950,245 dated Aug. 16, 2011.
Notice of Allowance from U.S. Appl. No. 11/938,091 dated Aug. 24, 2011.
Final Office Action from U.S. Appl. No. 11/927,159 dated May 26, 2011.
Final Office Action from U.S. Appl. No. 11/927,099 dated Jun. 1, 2011.
Examiner's Answer from U.S. Appl. No. 11/862,938 dated Aug. 17, 2011.
Non-Final Office Action from U.S. Appl. No. 11/942,608, dated Jun. 17, 2013.
Final Office Action from U.S. Appl. No. 11/950,245, dated Apr. 25, 2013.
Advisory Action from U.S. Appl. No. 11/950,245, dated Aug. 9, 2013.
Non-Final Office Action from U.S. Appl. No. 12/333,244, dated Jun. 1, 2012.
Notice of Allowance from U.S. Appl. No. 12/333,244, dated Aug. 23, 2012.
Notice of Allowance from U.S. Appl. No. 11/927,159, dated May 10, 2012.
Notice of Allowance from U.S. Appl. No. 11/927,099, dated Jun. 27, 2012.
Notice of Decision on Rejection from Chinese Patent Application No. 200810172720.0, dated Sep. 23, 2011.
Office Action from Taiwan Patent Application No. 097143617, dated Jul. 16, 2012.
Notice of Allowance from U.S. Appl. No. 12/333,255, dated Apr. 11, 2012.
Final Office Action from U.S. Appl. No. 11/942,608, dated Nov. 18, 2013.
Notice of Allowance from U.S. Appl. No. 11/940,782, dated Oct. 30, 2013.
Non-Final Office Action from U.S. Appl. No. 11/950,245, dated Sep. 26, 2013.
Advisory Action from U.S. Appl. No. 11/942,608, dated Feb. 12, 2014.

* cited by examiner

SYSTEM, METHOD, AND COMPUTER PROGRAM PRODUCT FOR GROUPING LINEARLY ORDERED PRIMITIVES

FIELD OF THE INVENTION

The present invention relates to ray tracing, and more particularly to data structures for facilitating ray tracing.

BACKGROUND

Ray tracing involves a technique for determining the visibility of an object or objects from a given point, such as, but not limited to, an "eye" or "camera" point, by following a ray. While such techniques theoretically can involve testing a vast number of rays against each and every primitive, this is typically not practical. Instead, designers have used various data structures to identify a subset of such primitives to be involved in the testing, thereby reducing required processing. Examples of such data structures include bounding volume hierarchies (BVHs), kd-trees (k-dimensional trees), binary space partitioning (BSP) trees, etc.

Many techniques have been utilized for constructing such data structures in the past. However, such techniques have focused mainly on building binary data trees. Additionally, existing techniques typically construct the data trees during a pre-processing step where data trees are assumed to be constructed offline and only traversed at render time. There is thus a need for addressing these and/or other issues associated with the prior art.

SUMMARY

A system, method, and computer program product are provided for grouping linearly ordered primitives. In operation, a plurality of primitives are linearly ordered. Additionally, the primitives are grouped. Furthermore, at least one intersection query is performed, utilizing the grouping.

DETAILED DESCRIPTION

Figure 1:
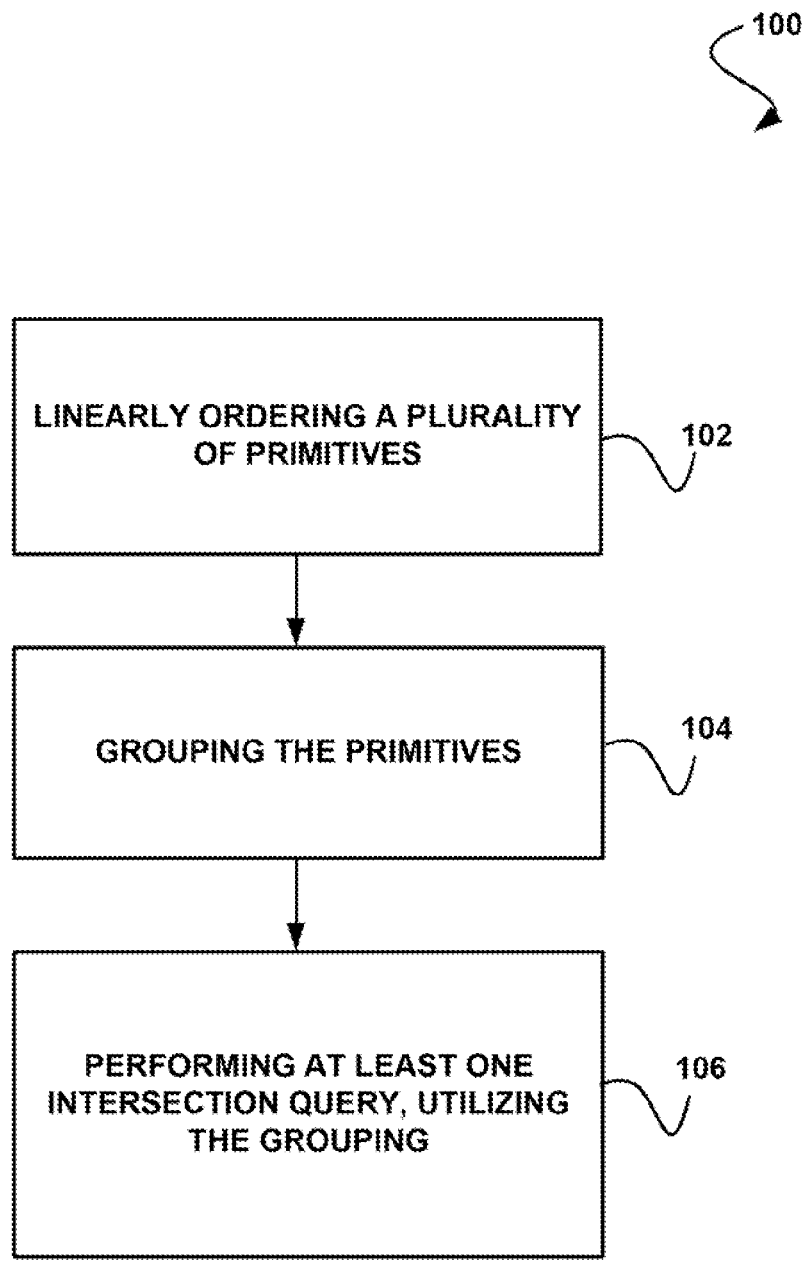
FIG. 1 shows a method for grouping linearly ordered primitives and performing at least one intersection query, in accordance with one embodiment of the present invention.

FIG. 1 shows a method 100 for grouping linearly ordered primitives and performing at least one intersection query, in accordance with one embodiment of the present invention. In operation, a plurality of primitives are linearly ordered. See operation 102.

In the context of the present description, the primitives may include any object capable of being linearly ordered and grouped in a meaningful way. For example, in various embodiments, the primitives may include points, lines or line segments, planes, circles, spheres, triangles or other polygons, spheres, cubes, toroids, pyramids, and/or any other geometric primitive. As an option, the primitives may include two-dimensional or three-dimensional primitives.

Furthermore, in the context of the present description, linearly ordering primitives refers to ordering the primitives in any type of linear sequence. For example, in one embodiment, the primitives may be linearly ordered according to a space-filling curve. In this case, any type of space-filling curve may be utilized [e.g. a Lebesgue curve (i.e. Morton curve, Z curve, etc.), a Sierpiński curve, a Peano curve, a Hilbert curve, etc.].

Additionally, the primitives are grouped. See operation 104. The primitives may be grouped utilizing any number of techniques. For example, the primitives may be grouped into bounding volumes (e.g. bounding boxes, etc.). In one embodiment, the primitives may be grouped into a bounding volume hierarchy (BVH). Of course, in various embodiments the primitives may be grouped in any number of ways (e.g. using kd-trees, BSP trees, etc.).

In another embodiment, the primitives may be grouped based on the linear ordering. For example, the primitives may be linearly ordered based on a space-filling curve. In this case, codes corresponding to the primitives location along the space-filling curve may be used to group the primitives.

Furthermore, at least one intersection query is performed, utilizing the grouping. See operation 106. In the context of the present description, an intersection query refers to testing an intersection of any object (e.g. line segment, ray, etc.) with any geometric primitive. For example, in one embodiment, the intersection query may be performed for ray tracing. Here "ray tracing" refers to any computation which, given a ray or line segment, determines one or more primitives or groups containing primitives which intersect or nearly intersect the ray/segment.

Strictly as an option, the ordering and/or the grouping may be performed utilizing a parallel processing architecture. In the context of the present description, the parallel processing architecture may include any architecture including a plurality of parallel processors or processing components. In one embodiment, the parallel processing architecture may include a graphics processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1A:
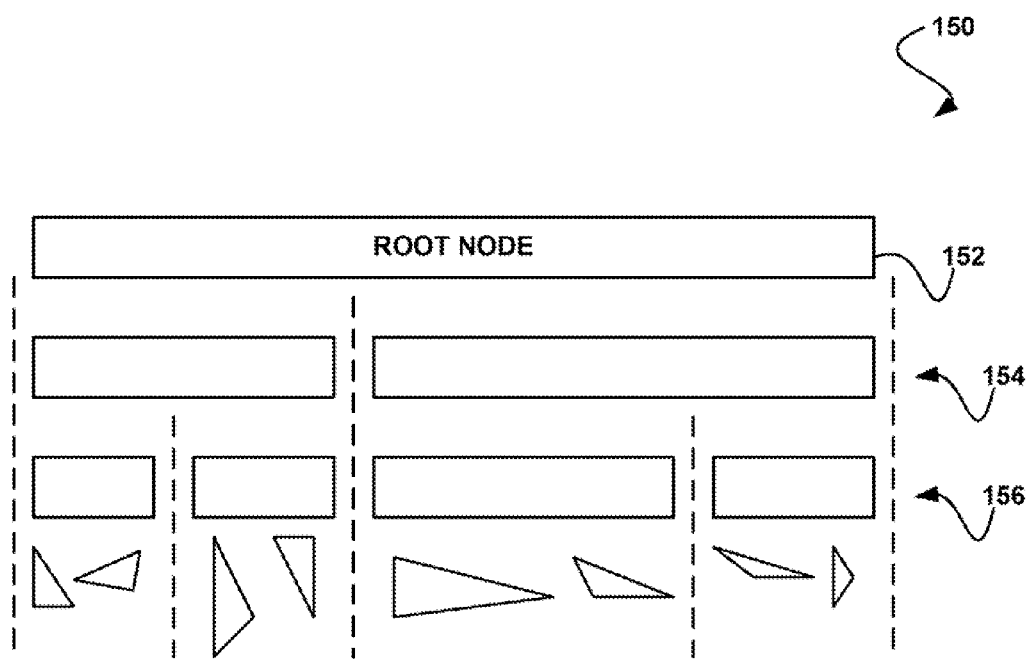
FIG. 1A shows a technique for grouping linearly ordered primitives, in accordance with one embodiment of the present invention.

FIG. 1A shows a technique 150 for grouping linearly ordered primitives, in accordance with one embodiment of the present invention. As an option, the present technique may be implemented in the context of the details of the method 100 of FIG. 1. Of course, however, the present technique may be implemented in any desired environment. It should also be noted that the aforementioned definitions may apply during the present description.

As shown, a root node 152 is provided. In this case, the root node encompasses all the primitives in a linearly ordered sequence. In operation, input primitives (e.g. triangles, etc.) are arranged in a linear order. The root node is partitioned or grouped amongst two children 154. These two children are each partitioned into two children 156 and subsequent children are partitioned until a group including a desired number of primitives is present. Note that each of the nodes or groups being created correspond to a contiguous set of primitives in the underlying linearly order sequence.

In this way, a tree data structure may be created. For example, a bounding volume hierarchy (BVH) may be constructed given a set of input primitives. In one embodiment, the resulting BVH may be a tree with the input primitives distributed amongst leaves of the BVH. In this case, each node may have an associated bounding volume that completely encloses all the primitives contained in the sub-tree rooted at that node.

As an option, the bounding volumes used may include axis-aligned bounding boxes (AABBs), although any bounding volume may be utilized. In one embodiment, a BVH may be constructed with a branching factor greater than 2. As an option, the BVH may be constructed at render time, rather than during a pre-process step. In general, any type of grouping may occur at render time (e.g. a time during which an image is being rendered).

Figure 2:
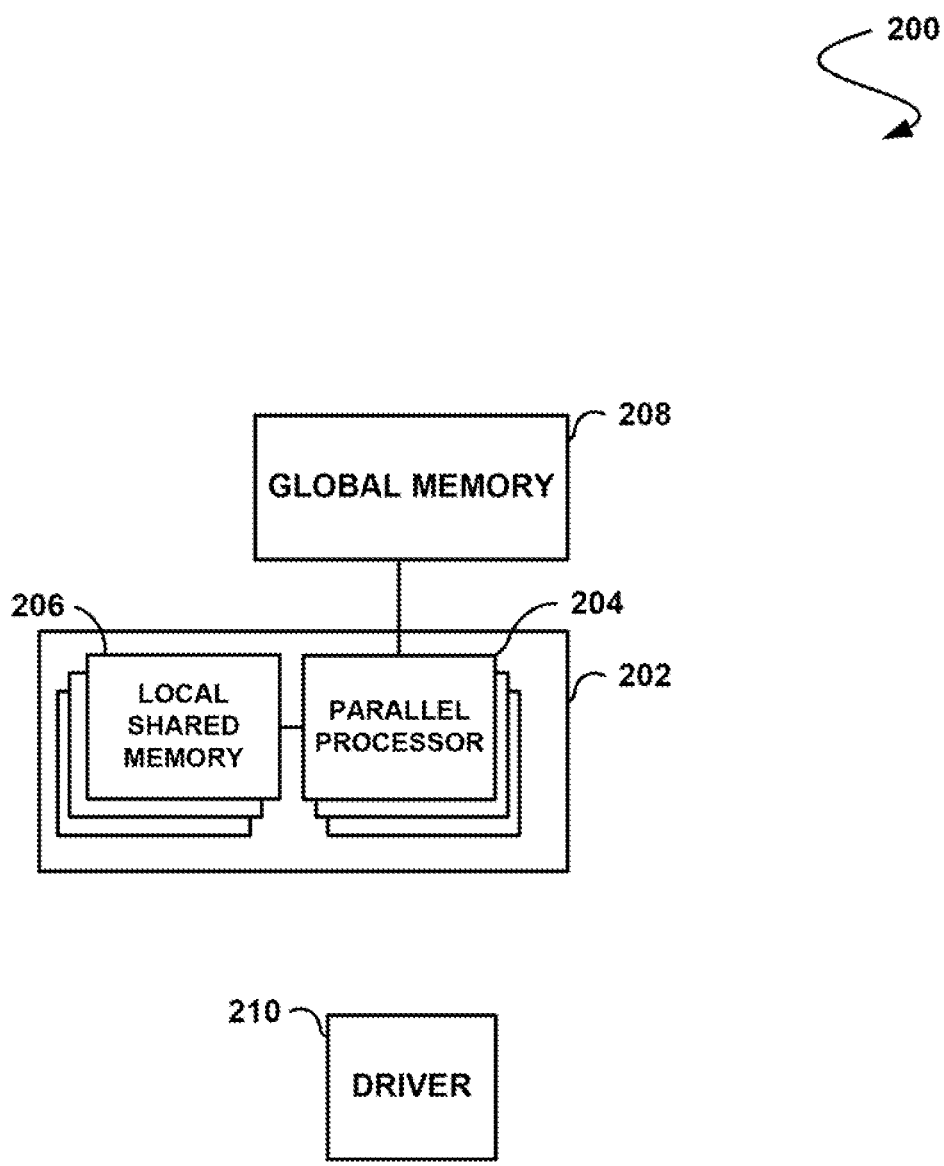
FIG. 2 shows a system for grouping linearly ordered primitives, in accordance with one embodiment of the present invention.

FIG. 2 shows a system 200 for grouping linearly ordered primitives, in accordance with one embodiment of the present invention. As an option, the present system may be implemented to carry out the method 100 of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

In one embodiment, the parallel processing architecture may include a single instruction multiple data (SIMD) architecture. In such a system, the threads being executed by the processor are collected into groups such that at any instant in time all threads within a single group are executing precisely the same instruction but on potentially different data.

In another embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture includes local shared memory 206. Each of the parallel processors of the parallel processing architecture may read and/or write to its own local shared memory. This shared memory may consist of physically separate memories associated with each processor or it may consist of separately allocated regions of one or more memories shared amongst the processors. Further, in the illustrated embodiment, the shared memory may be embodied on an integrated circuit on which the processors of the parallel processing architecture are embodied.

Still yet, global memory 208 is shown to be included. In use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein. Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation. In use, the driver may be used to control the parallel processing architecture to operate in accordance with the method of FIG. 1.

Figure 3:
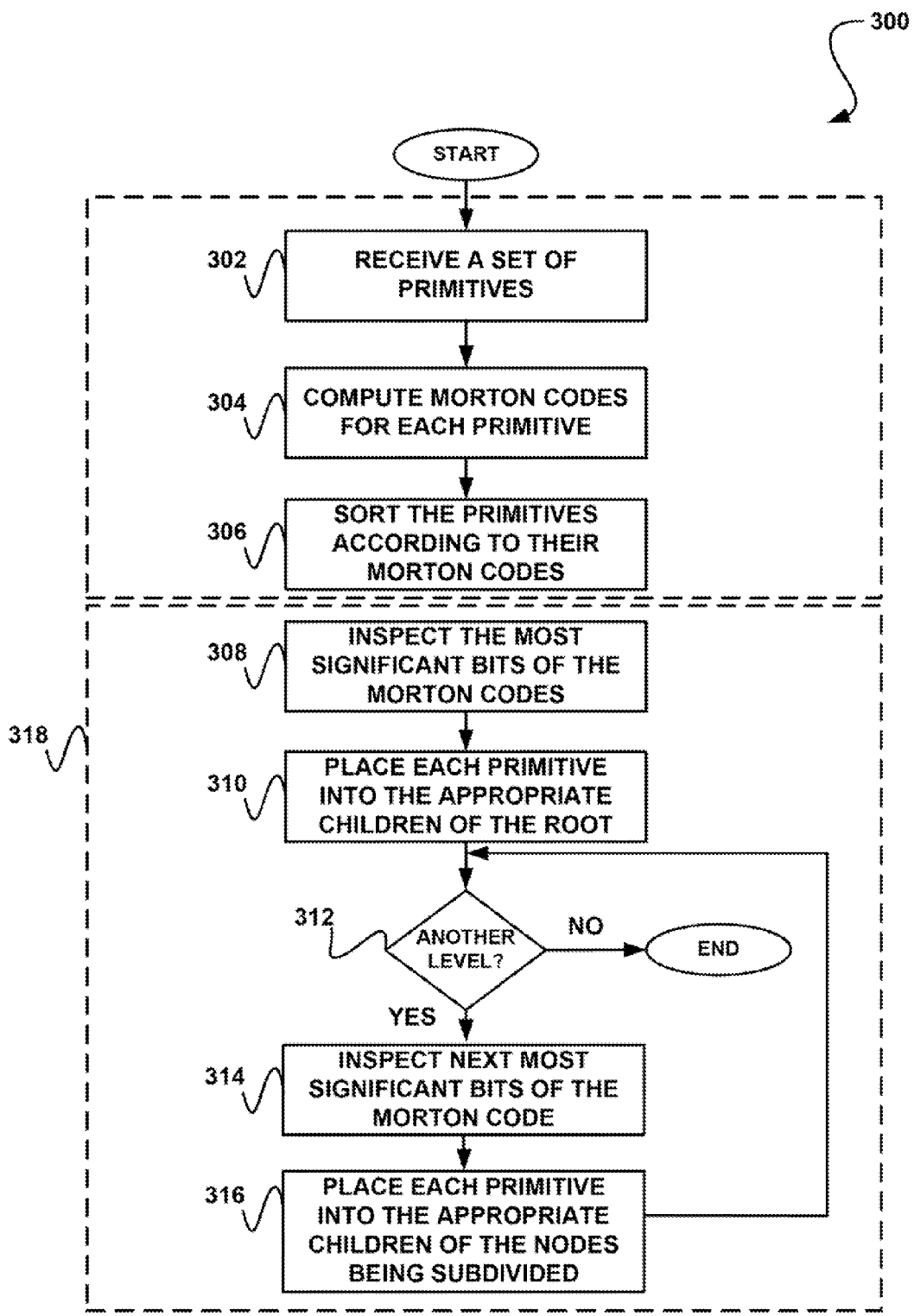
FIG. 3 shows a method for grouping linearly ordered primitives, in accordance with another embodiment of the present invention.

FIG. 3 shows a method 300 for grouping linearly ordered primitives, in accordance with another embodiment of the present invention. As an option, the present method may be carried out in the context of the details of FIGS. 1-2. Of course, however, the present method may be carried out in any desired environment. It should also be noted that the aforementioned definitions may apply during the present description.

As shown, a set of primitives is received. See operation 302. Such set of primitives may be a set of primitives in a frame, for example. Morton codes are then computed for each primitive. See operation 304. A Morton code is a scheme for assigning a spatial index code to a point in space. Such codes may be ascertained from utilizing a Morton curve, for example. Although, Morton codes are discussed in the context of the present description, it should be noted that any code ascertained from linear ordering primitives may be utilized (e.g. applying a space-filling curve, etc.).

Once the Morton codes have been calculated for each primitive, the primitives are sorted according to the Morton codes. See operation 306. Once the primitives have been sorted, a data tree may be constructed on the sorted list of primitives. In the context of Morton codes, a sub-method 318 shows how to build a tree on the sorted list of primitives, according to one embodiment.

As shown, one or more of the most significant bit of the Morton Code is inspected. See operation 308. The number of bits being examined is typically chosen based on the desired branching factor of the hierarchy being constructed. Each primitive is then placed into an appropriate child node of a root node based on the value of these bits. See operation 310. In other words, a dividing line may be drawn between nodes where the most significant bits of the Morton code changes.

It is then determined whether another level of nodes is needed. See decision 312. This determination may be based on a variety of factors, including, but not limited to, a number of primitives in previously constructed child nodes and a number of remaining bits in the Morton code.

If another level is needed, the next most significant group of bits of the Morton codes are inspected. See operation 314. In other words, another dividing line may be drawn between nodes where the most significant bits of the Morton code changes. Each primitive is then placed into the appropriate child nodes of the nodes being subdivided. See operation 316.

Figure 4A:
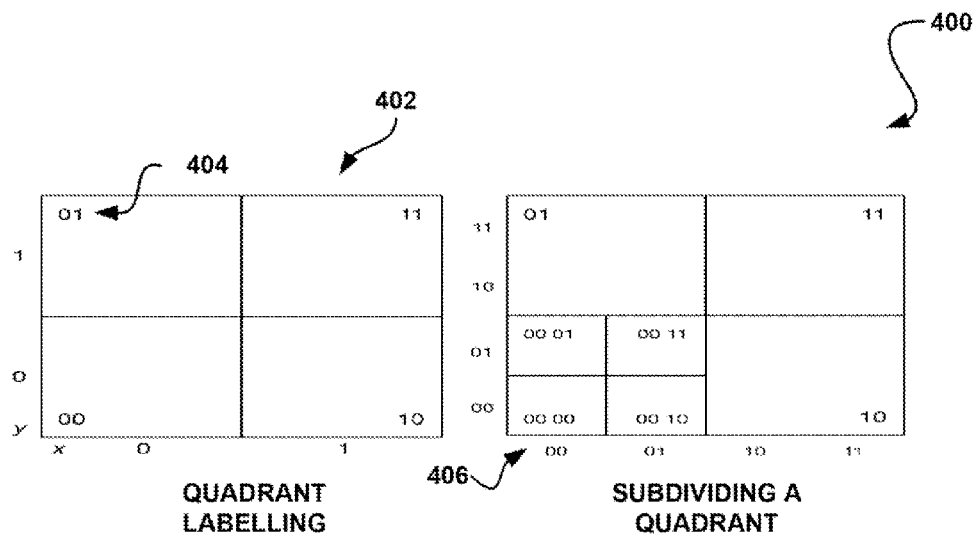
FIG. 4A shows a technique for labeling a 2-dimensional space using Morton Codes, in accordance with one embodiment of the present invention.

FIG. 4A shows a technique 400 for labeling a 2-dimensional space using Morton Codes, in accordance with one embodiment of the present invention. As an option, the present technique may be carried out in the context of the details of FIGS. 1-3. For example, the present technique may be used in conjunction with operation 304 of FIG. 3. Of course, however, the present technique may be carried out in any desired environment. Again, the aforementioned definitions may apply during the present description.

As shown, a point in a plane is considered where an axis-aligned bounding box (AABB) of all possible point positions is known. It should be noted that, although an AABB is discussed in the context of the present description, any bounding volume representation may be utilized. For example, in various embodiments, such bounding volume may include spheres, oriented bounding volumes, discrete oriented polytopes (DOP), k-DOPs, etc.

In operation, the bounding box may be divided into quadrants 402, with labeling 404. It should be noted that, in this labeling, the most significant bit indicates which half space in the x direction the point lies in, and the second bit encodes they half space. The same construction may be applied recursively, dividing each quadrant into sub-quadrants 406 and adding two more bits to a positional index.

Thus, a planar Morton code with 2n bits corresponds to a labeling of 2-D space by the nodes of a quadtree of depth n+1. Given the (x, y) coordinates of a point, the Morton code may be directly computed. Within the AABB established to contain the points, the coordinates may be quantized on a $2^n \times 2^n$ lattice. The Morton code may be constructed by interleaving the bits of the resulting n-bit integers.

To assign a code to a primitive, a representative point may be selected in the primitive from which to construct the code. There are many possible choices. For example the representative point may include its barycenter, the corner with minimum x or y coordinate, the corner with smallest Morton code, etc.

In the context of the present description, the barycenter refers the center of mass of an object. Such objects may be primitives or groups of primitives, for example. In one embodiment, the barycenter of the minimum AABB containing the primitive may be selected for the purposes of building a BVH for ray tracing.

Figure 4B:
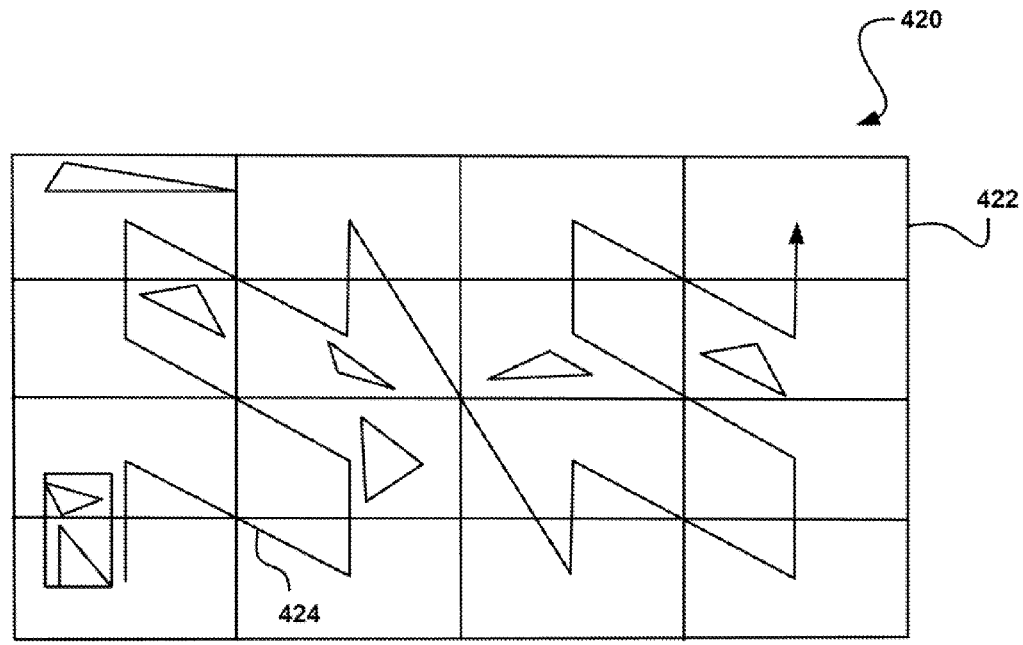
FIG. 4B shows a technique for linearly ordering triangles in a 2-dimensional space using a Morton curve, in accordance with one embodiment of the present invention.

FIG. 4B shows a technique 420 for linearly ordering triangles in a 2-dimensional space using a Morton curve, in accordance with one embodiment of the present invention. As an option, the present technique may be carried out in the context of the details of FIGS. 1-4A. Of course, however, the present technique may be carried out in any desired environment. Yet again, the aforementioned definitions may apply during the present description.

As shown, a space 422 has been divided into a 4×4 grid. In this case, each point will be given a 4-bit Morton code. A line 424 indicates a traversal of space induced by the Morton codes from 0000 (bottom left) to 1111 (upper right). Given a set of triangles, the Morton codes are computed for each triangle and the triangles are sorted in increasing order of their Morton codes.

In this way, the triangles may be linearly ordered. Such linear ordering may resemble the root node of FIG. 1A, for example. Having sorted the triangles in this order, the root node may be divided and the nodes of a tree data structure (e.g. a BVH) may be determined.

Once the triangles have been sorted according to their Morton code, the hierarchy may be constructed. For example, to produce a 4-way tree, the first 2 most significant bits of the Morton codes may be examined. Each triangle may be placed into 1 of 4 children of the root node indicated by these 2 bits.

In other words, the dividing line may be drawn between nodes where the top 2 bits of the Morton code changes. This process may be recursively applied within each node based on the next 2 bits of the Morton code until each node contains less than a target number of triangles or all of the bits in the code are used. It should be noted that, although the FIG. 4B illustrates a Morton curve applied to a group of triangles, any primitive may equally be utilized.

Figure 4C:
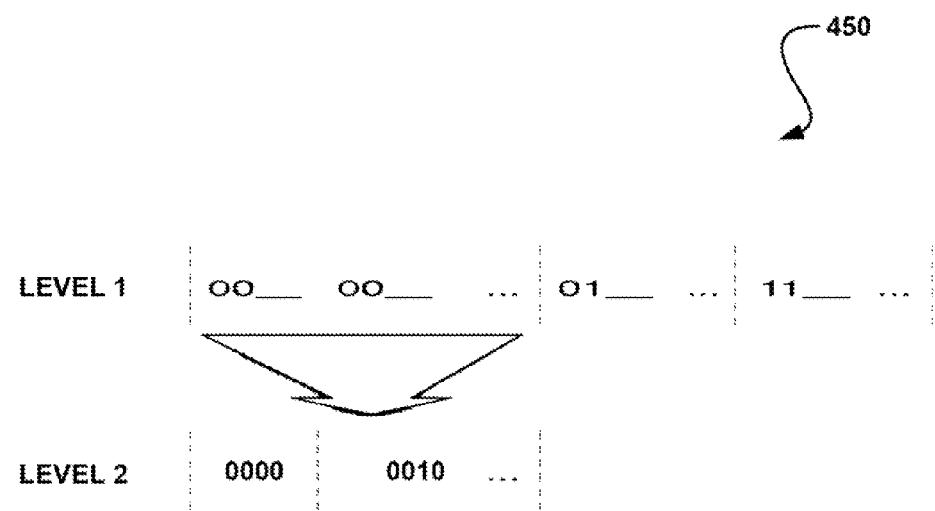
FIG. 4C shows a technique for constructing a data hierarchy using Morton codes, in accordance with one embodiment of the present invention.

FIG. 4C shows a technique 450 for constructing a data hierarchy using Morton codes, in accordance with one embodiment of the present invention. As an option, the present technique may be carried out in the context of the details of FIGS. 1-4B. Of course, however, the present technique may be carried out in any desired environment. It should also be noted that the aforementioned definitions may apply during the present description.

As shown, a top 2 bits of the Morton codes of the triangles are examined in their sorted order. The triangles are then divided between nodes where the Morton codes change. In this example, within the node for quadrant "00," the next pair of bits are examined and the node is again divided where the code changes. It should be noted that trees with a $2^b$ branching factor may be produced by examining b bits at a time.

Sorting the triangles by Morton code and detecting whether Morton codes of two consecutive triangles differ in a bit position allows for an efficient data parallel implementation of a hierarchy construction on a graphics processing unit (GPU). For example, a list of triangles may be received and a Morton code may be determined for each triangle. In one embodiment, the triangles may be sorted in parallel. For example, the triangles may be sorted in parallel using a parallel radix sort.

Once the triangles are sorted, each adjacent pair of triangles i and i+1 may be examined to determine where in the tree they will be separated into different nodes. This may be accomplished in parallel because all of the information to determine where in the tree they will be separated is contained in the Morton code.

For a tree with a branching factor of $2^b$ the Morton code may be considered as a sequence of b-bit digits, one for each level of the tree. Together, these digits completely encode the path that a point will take from the root of the tree to the leaf containing the point. If two triangles have the same Morton code, then they will be in the same leaf. If they differ, the first digit in which they differ indicates where in the tree they follow different paths to their appropriate leaves.

Figure 5:
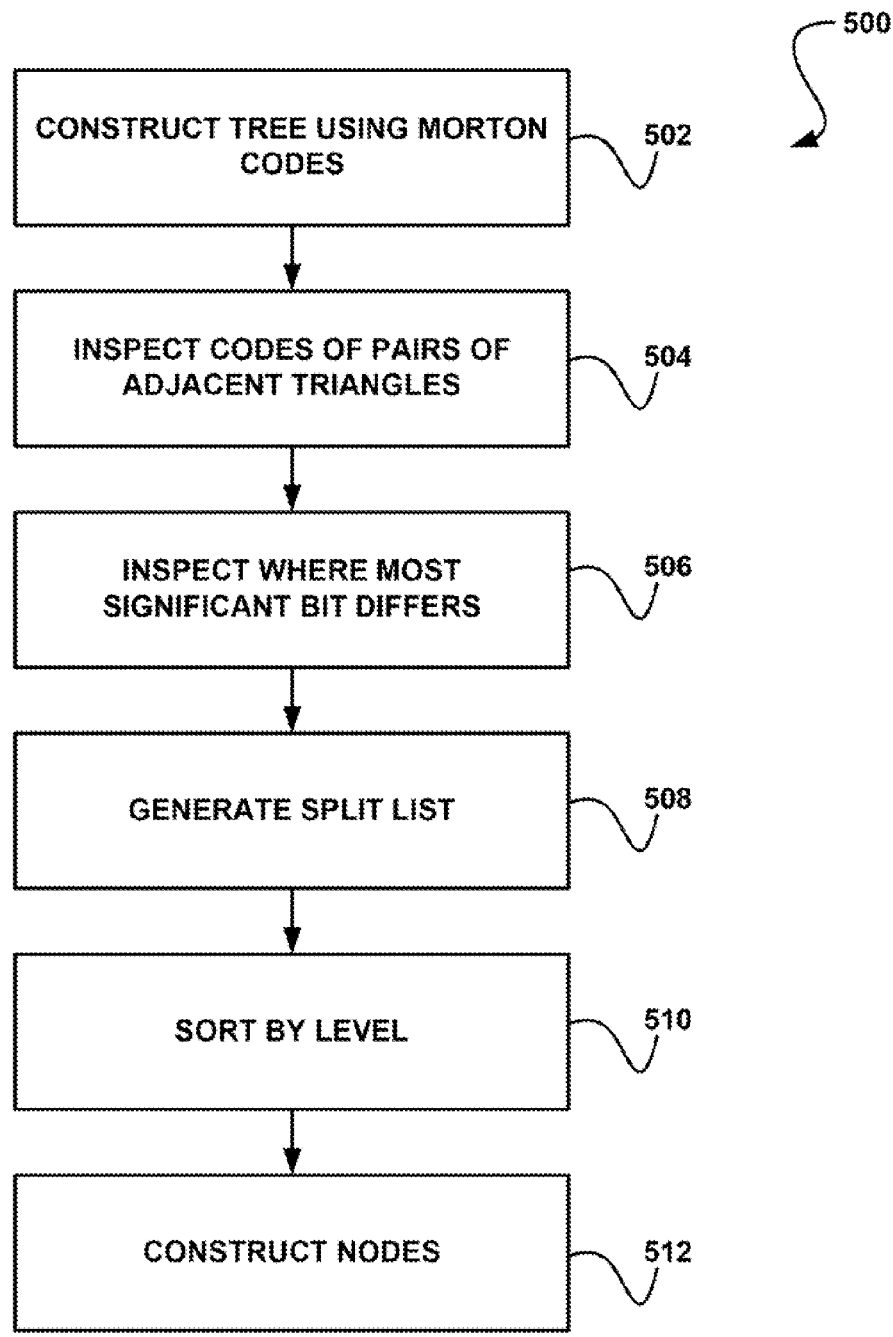
FIG. 5 shows a method for grouping linearly ordered primitives, in accordance with another embodiment of the present invention.

FIG. 5 shows a method 500 for grouping linearly ordered primitives, in accordance with another embodiment of the present invention. As an option, the present method may be carried out in the context of the details of FIGS. 1-4. Of course, however, the present method may be carried out in any desired environment. It should also be noted that the aforementioned definitions may apply during the present description.

As shown, a tree data structure is constructed using Morton codes. See operation 502. In one embodiment, the data tree structure may be a BVH, constructed utilizing AABBs.

The Morton codes for pairs of adjacent triangle are then inspected. See operation 504. Although triangles are used to describe the implementation of the current method, it should be noted that any type of primitive may be equally utilized. The Morton codes are then utilized to determine where the most significant bit differs. See operation 506. For example, the bits in the Morton code may be inspected sequentially to determine where the first bit in the code differs.

A split list is then generated, based on that determination. See operation 508. For example, triangles that differ at a given bit of their Morton Codes may be split, or divided. The split list may then be sorted by level. See operation 510. In other words, given that the split occurred at a certain bit in the Morton code, such split will correspond to a level in the tree data structure. Nodes of the tree data structure may then be constructed based on these levels. See operation 512.

Figure 6:
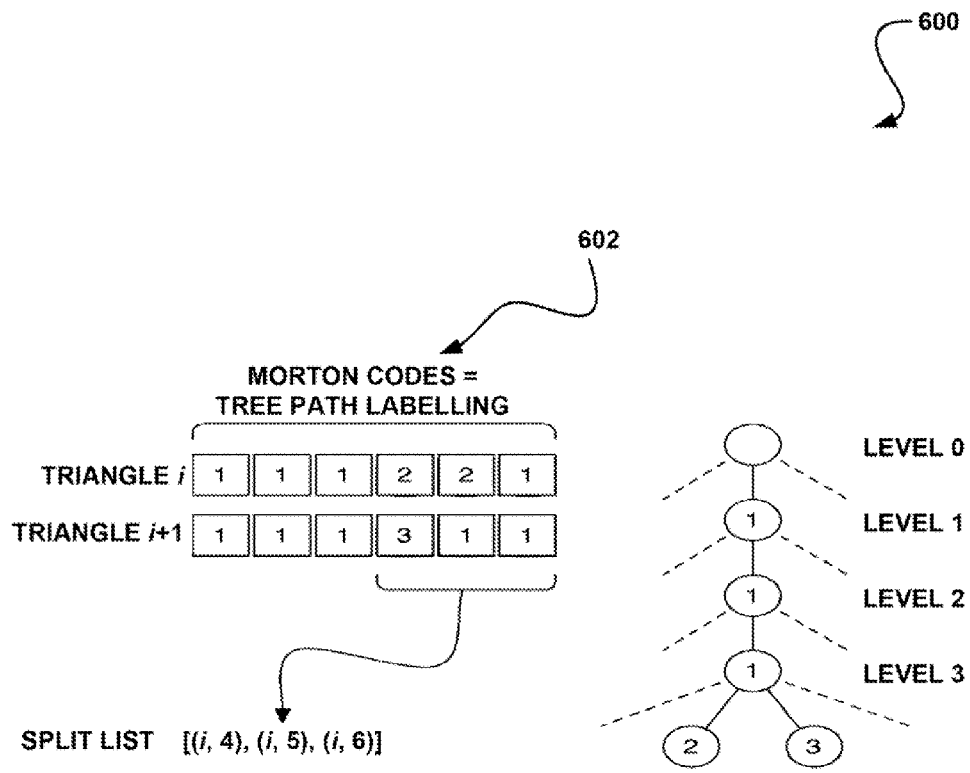
FIG. 6 shows a technique for generating a list of tree splits from adjacent primitives, in accordance with one embodiment of the present invention.

FIG. 6 shows a technique 600 for generating a list of tree splits from adjacent primitives, in accordance with one embodiment of the present invention. As an option, the present technique may be carried out in the context of the details of FIGS. 1-5. Of course, however, the present technique may be carried out in any desired environment. It should also be noted that the aforementioned definitions may apply during the present description.

As shown, two adjacent triangles 602 with Morton codes "111221" and "111311" are provided. Since the first three digits of the Morton codes are the same, these triangles will be contained within the same node for the first three levels of a tree data structure. However, the Morton codes differ at the $4^{th}$ digit. Thus, from level 4 on, the triangles will be in different sub-trees.

In a linear hierarchy, nodes may be constructed by indicating the dividing line in a list of linear ordered primitives at which those nodes stop and start. In other words, for triangles i and i+1, any levels where the triangles should be split into separate nodes may be determined. These "split lists" may be determined for each adjacent pair in parallel.

For example, with respect to FIG. 5, these two triangles will be in separate sub-trees in levels 4, 5, and 6. Hence, the fact that a split must exist between them at each level may be recorded. In one embodiment, such recording may include recording an index of the triangle and the level of the split as a pair.

In this way, if the recording is completed for each adjacent pair and all the resulting lists are concatenated, a list may be developed of all splits in the tree sorted by the index of the triangles in the linear Morton order. This list may be resorted by level (i.e. the second item of each pair). In this case, a list may be provided where, for each level, a list of all the splits that should occur on this level is present. The resulting list provides the intervals spanned by the various nodes at a level.

In one embodiment, the parallel construction of the tree may create chains of singleton nodes in the tree. As an option, an additional post-process may be included that starts at the leaves of the tree and walks up to the root, rolling up singleton chains in the process, so that no more singleton chains remain. Of course, such additional post-process is optional and should not be construed as limiting in any manner.

In another exemplary embodiment, which may or may not be implemented in the context of the details of FIGS. 1-6, a bottom-up construction scheme may be implemented for grouping primitives. For example, once triangles have been sorted according to their Morton code, leaf nodes of a hierarchy may be formed by collecting groups of up to B consecutive triangles together. These leaves may then be grouped into nodes by, again, collecting them in groups of up to B consecutive elements. This process may continue until only one node (i.e. the root node) remains. As another option, an iterative improvement phase may be utilized to improve the tree to be utilized for grouping primitives.

Having built a single layer of nodes, the division lines have been selected between consecutive nodes. In one embodiment, for each division line, it may be determined whether the quality of the tree may be improved by moving the dividing line by 1 place to the left or right. For ray tracing, the total weighted surface area of the boxes being formed may correlate directly with the quality of the tree. However, other applications might utilize different quality measures.

If moving a particular division line does improve quality, the division line is slid over by 1 in the relevant direction. This process may be repeated until no more improvements may be made. For a well-behaved quality metric, such as surface area, this iteration may converge.

It should be noted that, although certain primitives (e.g. triangles) have been discussed in the context of certain embodiments above, such embodiments should not be limited to triangles as any geometric primitives of bounded extent may be utilized. It should also be noted that, any space-filling curves may be utilized in place of the Morton (or Lebesgue) curve. In addition to explicit curve constructions, any algorithms for reordering sets of polygons for greater coherence may be used in place of the space-filling curve. An example of such a construction would include, but is certainly not limited to, algorithms for ordering triangles to achieve greater cache coherence.

Additionally, the data tree hierarchies described above store all primitives at the leaf nodes, which is often utilized in the context of ray tracing traversal. However, in other embodiments, the primitives may be stored at internal nodes as well. One natural scheme for determining the proper level of a triangle is to find the level in the tree whose intrinsic scale is closest to the maximum edge length of a triangle. The intrinsic scale of a node may be derived from the size (e.g., diameter or side length) of a corresponding octree cell. Still yet, it should be noted that the above embodiments should not be limited to ray tracing as other uses are equally applicable (e.g. collision detection, etc.).

Figure 7:
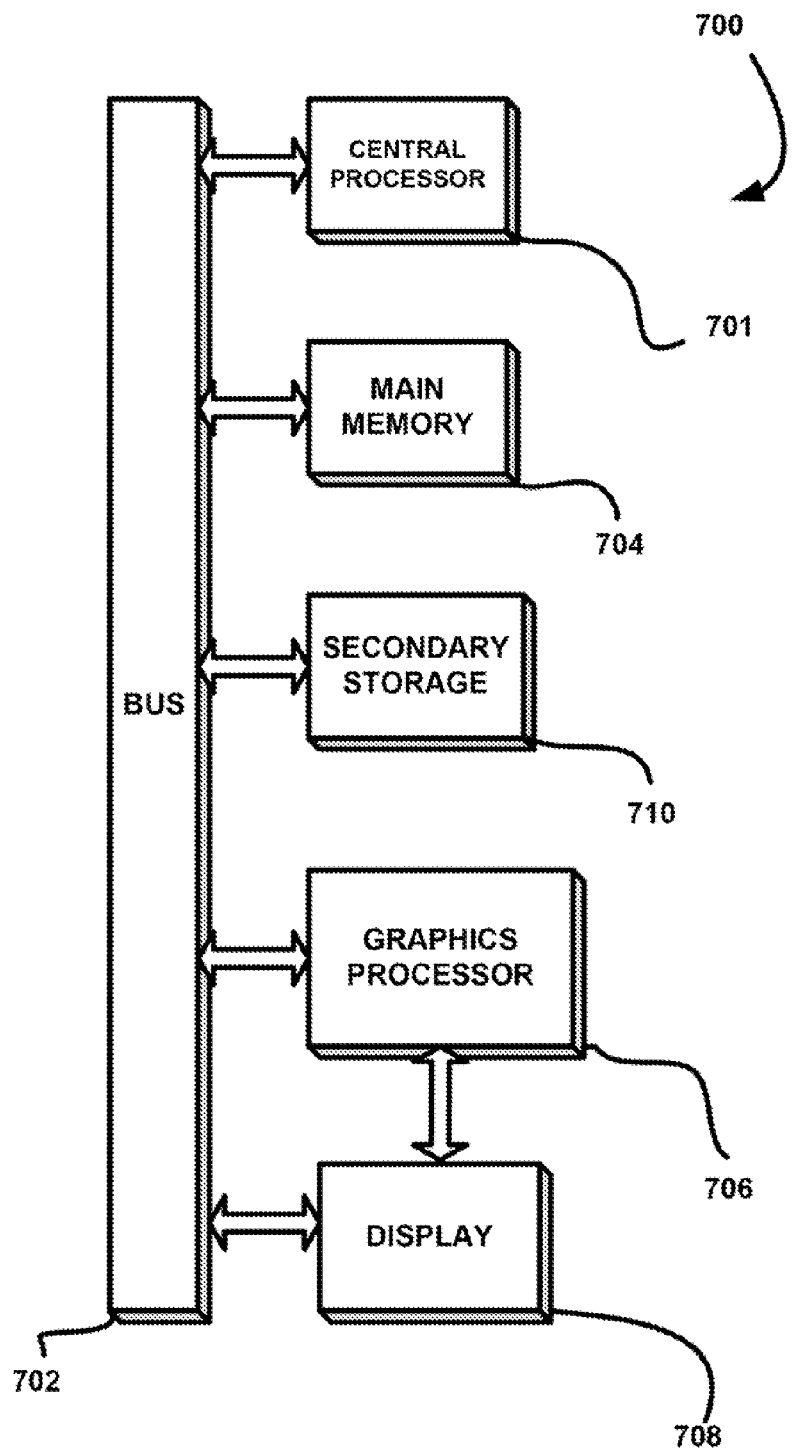
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system is provided including at least one host processor 701 which is connected to a communication bus 702. The system also includes a main memory 704. Control logic (software) and data are stored in the main memory which may take the form of random access memory (RAM).

The system also includes a graphics processor 706 and a display 708, i.e. a computer monitor. In one embodiment, the graphics processor may include a plurality of shader modules, a rasterization module, etc. Each of the foregoing modules may even be situated on a single semiconductor platform to form a GPU.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system may also include a secondary storage 710. The secondary storage includes, for example, a hard disk drive and/or a removable storage drive, representing a floppy disk drive, a magnetic tape drive, a compact disk drive, etc. The removable storage drive reacts from and/or writes to a removable storage unit in a well known manner.

Computer programs, or computer control logic algorithms, may be stored in the main memory and/or the secondary storage. Such computer programs, when executed, enable the system to perform various functions. Memory, storage and/or any other storage are possible examples of computer-readable media.

In one embodiment, the architecture and/or functionality of the various previous figures may be implemented in the context of the host processor, graphics processor, an integrated circuit (not shown) that is capable of at least a portion of the capabilities of both the host processor and the graphics processor, a chipset (i.e. a group of integrated circuits designed to work and sold as a unit for performing related functions, etc.), and/or any other integrated circuit for that matter. Further, the element grouping and ray tracing functionality of the various previous figures may, in one possible embodiment, be implemented in any of the foregoing integrated circuits, under the control of a driver 712.

Still yet, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, lap-top computer, and/or any other type of logic. Still yet, the system may take the form of various other devices including, but not limited to a personal digital assistant (PDA) device, a mobile phone device, a television, etc.

Further, while not shown, the system may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a plurality of primitives associated with a frame to be rendered via a ray-tracing algorithm;
   ordering the plurality of primitives in a linear sequence based on a space-filling curve;
   grouping the primitives in a bounding volume hierarchy that represents a plurality of bounding volumes based on the linear sequence; and
   performing intersection tests corresponding to a plurality of rays utilizing the bounding volume hierarchy.

2. The method of claim 1, wherein the primitives are two-dimensional primitives.

3. The method of claim 1, wherein the primitives are three-dimensional primitives.

4. The method of claim 1, wherein the primitives include at least one of polygons, lines, and points.

5. The method of claim 1, wherein the bounding volumes include bounding boxes.

6. The method of claim 5, wherein the bounding boxes include axis-aligned bounding boxes.

7. The method of claim 1, wherein the grouping occurs during a rendering process.

8. The method of claim 1, wherein the space-filling curve includes a Morton curve.

9. The method of claim 1, wherein the ordering is performed utilizing a parallel processing architecture.

10. The method of claim 9, wherein the parallel processing architecture includes one or more vector processing elements.

11. The method of claim 9, wherein the parallel processing architecture includes a graphics processor.

12. The method of claim 9, wherein the parallel processing architecture includes a single instruction multiple data (SIMD) architecture.

13. The method of claim 1, wherein the grouping is performed, utilizing a bottom-up construction.

14. The method of claim 13, wherein the bottom-up construction includes an iterative improvement phase.

15. The method of claim 1, wherein the grouping includes a tree data hierarchy having a branching factor of $2^b$, and a Morton code computed for each primitive in the group is comprised of b-bit digits which encode a path from a root of the tree data hierarchy to a leaf of the tree data hierarchy.

16. The method of claim 15, wherein if two of the primitives do not have a same Morton code, then a first digit in which the two of the primitives differ indicates where in the tree data hierarchy the two of the primitives follow different paths to their respective associated leaves.

17. The method of claim 1, wherein the primitives are sorted in increasing order of a key resulting from the space-filling curve.

18. The method of claim 1, wherein a root node encompasses the plurality of primitives in the linear sequence, and grouping the primitives includes partitioning the root node into child nodes, where each of the child nodes corresponds to a contiguous set of primitives of the linear sequence.

19. The method of claim 1, wherein ordering the plurality of primitives includes computing Morton codes for each primitive and sorting the plurality of primitives according to the Morton codes.

20. The method of claim 19, wherein grouping the primitives includes examining one or more bits of the Morton code for each primitive, and placing each primitive in a child node of a root node based on a value of the one or more bits.

21. The method of claim 19, wherein the Morton code for each primitive is computed based on a barycenter coordinate for an axis-aligned bounding box (AABB) for the primitive.

22. A computer program product embodied on a non-transitory computer readable medium, comprising:
   computer code for receiving a plurality of primitives associated with a frame to be rendered via a ray-tracing algorithm;
   computer code for ordering the plurality of primitives in a linear sequence based on a space-filling curve; and
   computer code for grouping the primitives in a bounding volume hierarchy that represents a plurality of bounding volumes based on the linear sequence; and
   computer code for performing intersection tests corresponding to a plurality of rays utilizing the bounding volume hierarchy.

23. An apparatus, comprising:
   a parallel processor architecture configured to:
      receive a plurality of primitives associated with a frame to be rendered via a ray-tracing algorithm,
      order the plurality of primitives in a linear sequence based on a space-filling curve, and group the primitives in a bounding volume hierarchy that represents a plurality of bounding volumes based on the linear sequence, perform intersection tests corresponding to a plurality of rays utilizing the bounding volume hierarchy.

24. The apparatus of claim 23, wherein the parallel processor architecture remains in communication with memory and a display via a bus.

* * * * *